(12) United States Patent
Yamashita et al.

(10) Patent No.: US 7,786,706 B2
(45) Date of Patent: Aug. 31, 2010

(54) METHOD FOR CHARGING RECHARGEABLE BATTERY

(75) Inventors: Takahiro Yamashita, Sumoto (JP); Tomoya Fukuda, Minami-awaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 618 days.

(21) Appl. No.: 11/723,312

(22) Filed: Mar. 19, 2007

(65) Prior Publication Data

US 2008/0094036 A1     Apr. 24, 2008

(30) Foreign Application Priority Data

Mar. 21, 2006   (JP) ............................ 2006-077882

(51) Int. Cl.
*H02J 7/04* (2006.01)
*H02J 7/16* (2006.01)
*H02J 7/00* (2006.01)

(52) U.S. Cl. ................. 320/162; 320/163; 320/152; 320/157; 320/130; 320/145

(58) Field of Classification Search ............... 320/162, 320/163, 152, 157
See application file for complete search history.

(56) References Cited

U.S. PATENT DOCUMENTS 5,998,968 A * 12/1999 Pittman et al. .............. 320/130

6,404,167 B1   6/2002   Sakakibara

FOREIGN PATENT DOCUMENTS

| JP | 07-298504   | 11/1995   |
|----|-------------|-----------|
| JP | 7-336908    | 12/1995   |
| JP | 8-205418    | 8/1996    |
| JP | 09-084272   | 3/1997    |
| JP | 2001-136674 | 5/2001    |
| JP | 2002-199605 | * 12/2002 |
| JP | 2004-194428 | 7/2004    |

* cited by examiner

*Primary Examiner*—Edward Tso
*Assistant Examiner*—Yalkew Fantu
(74) *Attorney, Agent, or Firm*—Wenderoth, Lind & Ponack, L.L.P.

(57) ABSTRACT

A method for charging a rechargeable battery by using a charge power supply that charges the rechargeable battery at constant voltage is provided. A pulse charge operation is performed at a charge process start. The charge process is stopped when current in the pulse charge operation is not greater than a predetermined value and it is determined that the rechargeable battery is in a full-charge state. On the other hand, the rechargeable battery is charged at constant voltage when the current in the pulse charge operation is greater than the predetermined value.

12 Claims, 2 Drawing Sheets

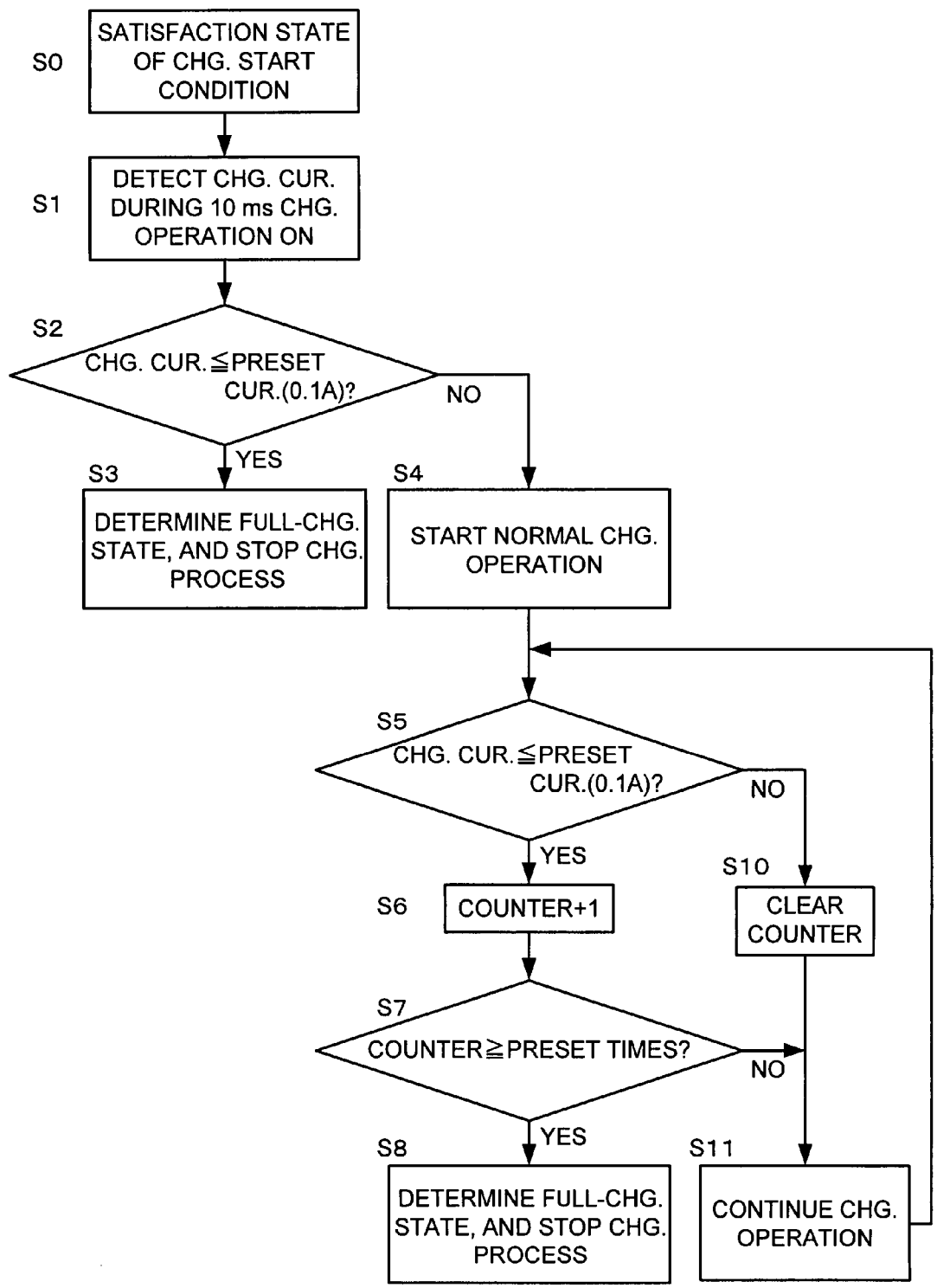

METHOD FOR CHARGING RECHARGEABLE BATTERY

BACKGROUND OF THE INVENTION

1. Field of the Invention

The present invention relates a method for charging a rechargeable battery.

2. Description of the Related Art

The following Patent Document (see Japanese Laid-Open Patent Publication TOKUKAI No. HEI 8-205418) discloses a charger which charges a lithium-ion rechargeable battery. As shown in FIGS. 4 and 5 of this Document, this type of charger includes a power supply portion 1, a charge control switch 2 which is provided on a charge path, and a calculation circuit 3 (microcomputer) which detects battery voltage and charge current, and controls the power supply portion 1 and the charge control switch 2. This power supply portion 1 includes feedback circuits for current and voltage. The power supply portion 1 includes a rectifying circuit 8, a switching portion 9, a conversion transformer 11, a pulse width modulation (PWM) control circuit 13, and a photocoupler 17. The rectifying circuit 8 converts alternating current into direct current. The switching portion 9 converts the direct current of the rectifying circuit 8 into pulse current of high frequency. The PWM control circuit 13 controls the switching portion 9 and thus controls DC output. The photocoupler 17 provides a control signal to the PWM control circuit 13.

A constant current charge circuit 6 and the photocoupler 17 are used as the feedback circuit for current. When charge current exceeds a predetermined value, the photocoupler 17 is brought in a non-conduction state. In this case, based on this non-conduction state as a feedback signal, the PWM control circuit 13 controls a transistor 10 so that the output becomes low. Thus, the charge current for battery is reduced. As a result, the constant current charge circuit 6 prevents that charge current for battery becomes larger than a predetermined value I1, and charges a battery at constant current.

On the other hand, a constant voltage charge circuit 5 and the photocoupler 17 are used as the feedback circuit for voltage. When charge voltage exceeds a predetermined value, the photocoupler 17 is brought in a non-conduction state. In this case, based on this non-conduction state as a feedback signal, the PWM control circuit 13 controls a transistor 10 so that the output becomes low. Thus, the charge voltage for battery is reduced. As a result, the constant voltage charge circuit 5 prevents that battery voltage becomes larger than a predetermined value, and charges the battery at constant voltage.

Instead of this control method, the following control method has been also used. In the Document, positive and negative terminals of a differential amplifier 5A of the constant voltage charge current 5 in FIG. 5 are inversely connected, while plus and minus terminals of a differential amplifier 6A of the constant current charge current 6 are inversely connected. In this method, the PWM control circuit 13 can be controlled so that, when charge voltage or current exceeds the predetermined value, the photocoupler 17 is brought in a conduction state. In this case, based on this non-conduction state as a feedback signal, the PWM control circuit 13 controls a transistor 10 so that the output becomes low. Thus, the charge voltage or current for battery is reduced. See Japanese Laid-Open Patent Publication TOKUKAI No. HEI 8-205418.

SUMMARY OF THE INVENTION

As discussed above, in the aforementioned known charge power supply, in a case where a lithium-ion (Li-ion) or lithium-polymer (Li-polymer) rechargeable battery is charged, secondary-side charge voltage is monitored, and is fed back to the primary side (Feedback).

However, this type of known power supply has the following disadvantages. In a case where a battery with voltage higher than a predetermined voltage of the charge power supply is mounted and a charge process starts, constant voltage Feedback operates so that the charge power supply output decreases. In this case, the output may stop or intermittently oscillate.

This phenomenon occurs due to the following mechanism.

1. A case where the constant voltage output of charger itself is 4.20 V and the voltage of a battery to be mounted is 4.21 V is taken as an example.
2. In the charger, a Feedback circuit constantly operates so that the output voltage is 4.20 V.
3. When the battery is mounted, and a charge switch turns ON, both the charge output voltage and the battery voltage become 4.21 V.
4. Since the charger has a predetermined voltage of 4.20 V, the Feedback portion provides an output reduction signal to a power supply portion to reduce the output voltage.
5. But the output voltage does not vary and remains 4.21 V of the battery voltage, thus, the Feedback portion continuously provides the signal that reduces the output.
6. The charge power supply reduces its power to a limit, and stops the charge output (a power supply operation stop), thus, power supply for secondary-side circuit is cut. In this case, as for the power supply for secondary-side circuit, the output from a conversion transformer is provided as electric power to a power supply in microcomputer, IC, and the like on the secondary side.
7. Since the secondary-side circuit stops, a signal of the Feedback circuit is stopped, thus, a secondary-side charge switch turns OFF.
8. After that, since the charge power supply is continuously provided with commercial electric power, the charge power supply starts providing electric power, thus, the charge output operation and a secondary-side power supply operation normally restart.
9. The events 3 through 8 are repeated, as a result, intermittent oscillation occurs.

For example, if a battery (voltage 4.20 V) that is charged to a full-charge state by one charger is mounted to another charger, in a case where its battery voltage is 4.20 V and the voltage value of constant voltage of the another charger is 4.20 V, it may be detected that the battery voltage is 4.21 V due to variations, errors, and the like of the detection voltage among chargers, and the battery is charged at constant voltage of 4.20 V. Accordingly, such phenomena of intermittent oscillation and a power supply operation stop occur.

In addition, due to difference among environment conditions in a charge process, even in a case where an identical charger is used, phenomena of intermittent oscillation and a power supply operation stop may occur.

In a case of a charger the charge output voltage of which increases/decreases as temperature varies, for example, its charge output voltage is 4.21 V at 0° C. and 4.20 V at 25° C., if the charger charges a battery to a full-charge state at 0° C., then the identical charger charges the battery at 25° C., intermittent oscillation occurs and the phenomenon of power supply operation stop occurs.

In order to prevent this type of power supply operation stop or intermittent oscillation, the following measures are conventionally taken.

The secondary-side power is supplied by a system independent of the charge output operation. That is, the circuitry in this case is constructed so that, even when the charge output decreases, the secondary-side power supply does not stop. For example, as for charge output, feedback is used so that a battery is charged at constant voltage similarly to the aforementioned known art, on the other hand, as for the secondary-side power supply operation, output is provided from a transformer other than a transformer that is used for charge output. In this case, even if a charge output operation stops, or intermittent oscillation occurs, a microcomputer, an IC, and the like on the secondary side can be continuously used. Accordingly, a microcomputer shutdown or the like does not occur.

A device which can precisely detect voltage is used. The charge output voltage and battery voltage are compared, when the battery voltage is higher than the charge output voltage, a charge operation does not start. However, in both types of measures, it is necessary to provide an additional circuitry component or to use an expensive component.

Therefore, the present invention is made to solve the above disadvantages, and its object is to provide a method for charging a rechargeable battery by using a charge power supply that charges the rechargeable battery at constant voltage, the method preventing intermittent oscillation and power supply output stop.

A method, according to the present invention, for charging a rechargeable battery by using a charge power supply that charges the rechargeable battery at constant voltage includes the steps of performing a pulse charge operation at a charge process start, and stopping the charge process when charge current is not greater than a predetermined value and it is determined that the rechargeable battery is in a full-charge state. In addition, the duration of the pulse charge operation is not less than 5 msec and not greater than 500 msec. Additionally, current is detected at a predetermined period, and the charge process stops when it is continuously counted to a predetermined number of times that the detected current is not greater than a predetermined value and it is determined that the rechargeable battery is in a full-charge state.

Since the aforementioned method for charging a rechargeable battery includes the steps of performing a pulse charge operation at a charge process start, and stopping the charge process when charge current is not greater than a predetermined value and it is determined that the rechargeable battery is in a full-charge state, even in a case where a battery with voltage higher than a predetermined value of constant voltage is charged, the charge process can stop before a problem such as intermittent oscillation and output stop of the charge power supply occur, or can immediately stop even if such a problem occurs.

In addition, this method can take measures against a power supply stop and intermittent oscillation by means of conventional circuitry construction without providing additional components.

The above and further objects of the present invention as well as the features thereof will become more apparent from the following detailed description to be made in conjunction with the accompanying drawings.

BRIEF DESCRIPTION OF THE DRAWINGS

FIG. 2 is a flow chart according to one embodiment of the present invention.

DETAILED DESCRIPTION OF THE INVENTION

Figure 1:
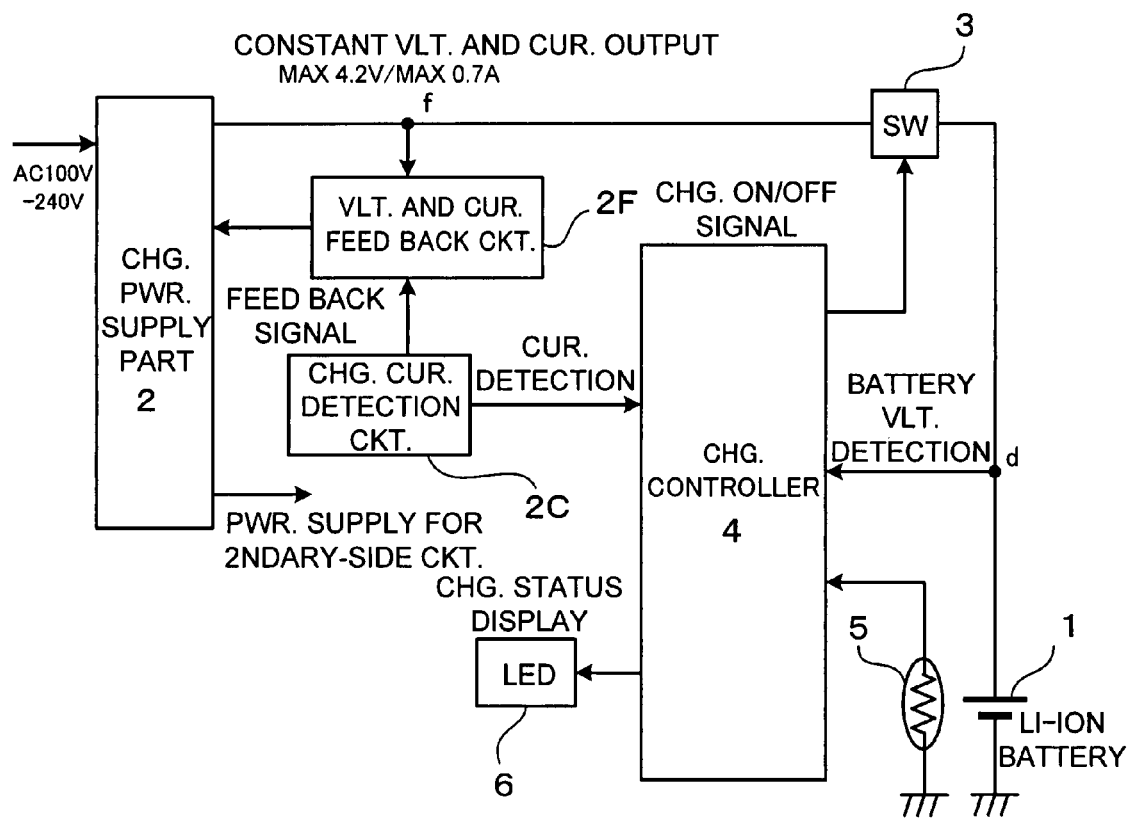
FIG. 1 is a circuit diagram showing an exemplary charger according to one embodiment of the present invention.

A charger A with a charge circuit shown in FIG. 1 includes a charge power supply portion 2 (charge power supply), a switching element 3, a charge control portion 4, and a temperature sensor 5 such as thermistor. The charge power supply portion 2 is a constant-voltage and constant-current power supply (Max. 4.2 V, and Max. 0.7 A) that provides charge current to a battery 1 which is detachably mounted to the charger. The switching element 3 is connected between the charge power supply 2 and the battery 1, and controls and adjusts the charge current for the battery 1. The charge control portion 4 includes a microcomputer that turns the switching element 3 ON/OFF, and thus controls and adjusts the charge current. The temperature sensor 5 detects the battery temperature, and provides a temperature signal to the charge control portion 4. A rechargeable battery such as lithium-ion (Li-ion) rechargeable battery and lithium-polymer (Li-polymer) rechargeable battery can be used as the battery 1. In addition, the charge control portion 4 provides a control signal to the charge power supply portion 2, and thus controls ON/OFF and the like of the charge power supply portion 2. Additionally, the charge power supply portion 2 serves as power supply for secondary-side circuit to provide output as electric power from a conversion transformer installed in the charge power supply portion 2 to circuitry components such as microcomputer and IC on the secondary side.

In a charge process, the charge control portion 4 turns the switching element 3 ON/OFF, and periodically stops charging the battery 1 (stops charging the battery 1 in about 0.01 to 1.0 sec during a period of about 0.5 to 5 sec, for example) so as to detect the battery voltage at a sensing point d. The reason is that the battery voltage can be precisely detected in a charge operation stop. However, the battery voltage may be detected in the charge operation. In addition, the switching element 3 can be turned ON/OFF for duty ratio adjustment so that the battery 1 is charged with constant current at a desired average current value by switching the switching element 3.

A conventional power supply similar to the aforementioned known art can be used as the charge power supply 2. The charge power supply 2 includes a voltage and current feedback circuit 2F. Similarly to the aforementioned known art, the feedback circuit 2F detects voltage at sensing point f, a charge current detection circuit 2C detects voltage of a current detection resistor (not shown), which is provided on a charge path. The feedback circuit 2F provides a feedback control signal, and provides output at constant voltage and constant current toward the secondary side. The charge power supply portion 2 provides electric power within predetermined maximum constant current and within predetermined maximum constant voltage, and charges the lithium-ion rechargeable battery 1. In a case where a battery with small remaining amount is charged, the charge power supply portion 2 provides the maximum constant current in early stages of the charge process, thus, the battery voltage rises within a range of the maximum constant voltage. Subsequently, the charge power supply portion 2 provides the maximum constant voltage, and current gradually decreases.

In addition, the charge control portion 4 turns the switching element 3 OFF and thus stops the charge operation if the battery temperature exceeds protection temperature (the extent of 60-65° C.), and the like.

In a case where the battery 1 does not have a thermistor, for example, in a case where standard D size to AAA size batteries are used, the charger A is constructed so that the temperature sensor 5 of a thermistor comes in contact with the battery 1, or is disposed in a position that allows proper temperature monitoring of the battery 1 even if not in contact with the battery 1 in a state where the battery 1 is mounted to charge terminals of the charger A. Accordingly, the battery 1 and the temperature sensor 5 are thermally coupled In addition, in a case where a battery pack is used as the battery 1, the temperature sensor 5 can be disposed inside and thermally coupled to the battery pack to monitor the temperature of the battery 1.

Additionally, the charge control portion 4 controls charge-proceeding status display by turning an LED 6, which indicates charge proceeding status, ON.

In a case of lithium-ion rechargeable battery and the like, the charge control portion 4 determines a full-charge state of the battery 1 in a known manner. That is, the charge control portion 4 detects current at a predetermined period, and when continuously counting a predetermined number of times that the detected current is not greater than a predetermined value and thus determining that the rechargeable battery 1 is in a full-charge state, the charge control portion 4 stops the charge process. This predetermined period for current detection can be the extent of 30 msec to 10 sec. In this case, the full-charge state is determined when the predetermined number of times is continuously counted. The reason is that the extent of one to several times may includes errors that wrongly detect that the detected current value is not greater than the predetermined value.

On the other hand, if this type of full-charge state determination method is only used, as discussed in the aforementioned known art, an output stop or intermittent oscillation may occur during the predetermined period that detect current. That is, as discussed above, for example, if a battery (voltage 4.20 V) that is charged to a full-charge state by one charger is mounted to another charger, in a case where its battery voltage is 4.20 V and the voltage value of constant voltage of the another charger is 4.20 V, it may be detected that the battery voltage is 4.21 V due to variations, errors, and the like of the detection voltage among chargers, and the battery is charged at constant voltage of 4.20 V. Accordingly, such phenomena occur.

In addition, due to difference among environment conditions in the charge operation, even in a case where an identical charger is used, phenomena of intermittent oscillation and power supply operation stop may occur.

In a case of a charger the charge output voltage of which increases/decreases, for example, its charge output voltage is 4.21 V at 0° C. and 4.20 V at 25° C., if the charger charges a battery to a full-charge state at 0° C., then the identical charger charges the battery at 25° C., intermittent oscillation occurs and the phenomenon of power supply operation stop occurs.

In this embodiment, in order to prevent such phenomena, prior to a step for detecting current at the predetermined period, the charge control portion 4 performs the pulse charge operation at a charge process start and detects the charge current. The charge control portion 4 stops the charge process when the charge current is not greater than a predetermined value and it is determined that the rechargeable battery 1 is in a full-charge state.

Operations according to this embodiment will be now described with reference to a flow chart of FIG. 2. Initially, in step S0, a flow according to this embodiment starts in a state where charge start conditions are satisfied. This state where charge start conditions are satisfied referred to a state where it is detected that the battery 1 is mounted and it is confirmed that the battery temperature is within a specified range (e.g., not less than 0° C. and not greater than 40° C.).

In step S1, the charge control portion 4 turns the switching element 3 ON and then turns it OFF so as to perform the pulse charge operation, and detects charge current. In this step, duration of the pulse charge operation is preferably the extent of not less than 5 msec and not greater than 500 msec, and is 10 msec in this embodiment. The duration of the pulse charge operation is preferably set shorter than a charge period in which phenomena such as the aforementioned intermittent oscillation and output stop occur (e.g., 30 msec to 500 msec).

Next, in step S2, it is determined whether the detected charge current is not greater than a predetermined current value (e.g., 0.1 A). If Yes, it is determined that the battery 1 is in a full-charge state, and the charge process is completed or stops. In step S2, if No, the battery 1 is not in a full-charge state, thus, a normal charge operation starts in step S4. Subsequently, in step S5, a counter, which is disposed inside the charge control portion 4, is incremented by 1. Subsequently, in step S7, it is determined whether the count of the counter is not less than a predetermined number of times (not less than about four times and not more than about twenty times, e.g., ten times). If the count is not less than the predetermined number of times, it is determined that the battery 1 is in a full-charge state, thus, the charge process stops, that is, the charge control portion 5 turns the switching element 3 OFF, and turns display of the LED 6 into charge-process-completion status display.

In addition, in step S5, if the detected charge current exceeds the predetermined current value, that is, if No, go to step 10, and the count of the counter is cleared. Subsequently, go to step S11, the charge operation is continued, and go to step S5. Additionally, in step S7, if the count of the counter is less than the predetermined number of times, that is, if No, go to step S11, the charge operation is continued, and go to step S5. Accordingly, steps S5 to S11 are repeated periodically (30 msec to 10 sec).

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-77882 filed in Japan on Mar. 21, 2006, the content of which is incorporated herein by reference.

What is claimed is:

1. A method for charging a rechargeable battery with a charge power supply that charges the rechargeable battery at constant voltage, the method comprising:
   detecting an initial current by applying a pulse voltage from a charge control portion before a normal charge operation and at a start of a charge process, and if the initial current is not greater than a predetermined value then;
   determining that the rechargeable battery is in a full-charge state and stopping the charge process, and if the initial current is greater than the predetermined value then;
   charging the rechargeable battery at constant voltage by providing electric power of the charge power supply in the normal charge operation.

2. The method according to claim 1, wherein a duration of applying the pulse voltage is not less than 5 msec and not greater than 500 msec.

3. The method according to claim 1, wherein in a state where the rechargeable battery is charged at constant voltage when it is determined that the current during the application of the pulse voltage is greater than the predetermined value, current is detected at a predetermined period, wherein the charge process stops when it is continuously counted to a predetermined number of times that the detected current is not greater than a predetermined value and it is determined that the rechargeable battery is in a full-charge state.

4. The method according to claim 3, wherein the period for current detection is 30 msec to 10 sec.

5. The method according to claim 1, wherein a power supply which increases/decreases charge output voltage as temperature varies is used as the charge power supply that charges the rechargeable battery at constant voltage.

6. The method according to claim 1, wherein a power supply which intermittently oscillates if a rechargeable battery with voltage higher than charge output voltage is used as the charge power supply that charges the rechargeable battery at constant voltage.

7. The method according to claim 1, wherein a power supply which stops power supply when a rechargeable battery with voltage higher than charge output voltage is used as the charge power supply that charges the rechargeable battery at constant voltage.

8. The method according to claim 1, wherein a charge power supply that charges the rechargeable battery at constant voltage by means of a feedback circuit for voltage is used.

9. The method according to claim 8, wherein the charge power supply that controls a pulse width modulation (PWM) control circuit by means of the feedback circuit for voltage to charge the rechargeable battery at constant voltage is used.

10. The method according to claim 9, wherein the PWM control circuit controls a transistor to charge the rechargeable battery at constant voltage.

11. The method according to claim 1, wherein a constant-current and constant-voltage power supply is used as the charge power supply that charges the rechargeable battery at constant voltage, and charges a lithium-ion rechargeable battery as the rechargeable battery.

12. The method according to claim 1, wherein a constant-current and constant-voltage power supply is used as the charge power supply that charges the rechargeable battery at constant voltage, and charges a lithium-polymer rechargeable battery as the rechargeable battery.

* * * * *